(12) United States Patent
Kujak

(10) Patent No.: US 10,465,961 B2
(45) Date of Patent: Nov. 5, 2019

(54) REFRIGERANT LEAK DETECTION BY USE OF FLUID ADDITIVE

(71) Applicant: TRANE INTERNATIONAL INC., Davidson, NC (US)

(72) Inventor: Stephen A. Kujak, Brownsville, MN (US)

(73) Assignee: TRANE INTERNATIONAL INC., Davidson, NC (US)

( * ) Notice: Subject to any disclaimer, the term of this patent is extended or adjusted under 35 U.S.C. 154(b) by 94 days.

(21) Appl. No.: 15/858,861

(22) Filed: Dec. 29, 2017

(65) Prior Publication Data

US 2018/0187937 A1 Jul. 5, 2018

Related U.S. Application Data

(60) Provisional application No. 62/440,806, filed on Dec. 30, 2016.

(51) Int. Cl.
| | |
|---|---|
| *G01K 13/00* | (2006.01) |
| *F25B 49/00* | (2006.01) |
| *F25B 45/00* | (2006.01) |
| *G01M 3/26* | (2006.01) |
| *F04B 43/00* | (2006.01) |
| *F24F 11/36* | (2018.01) |

(52) U.S. Cl.
CPC .......... *F25B 49/005* (2013.01); *F04B 43/009* (2013.01); *F24F 11/36* (2018.01); *F25B 45/00* (2013.01); *G01M 3/26* (2013.01); *F25B 2500/222* (2013.01)

(58) Field of Classification Search
CPC .. F25B 49/005; F25B 45/00; F25B 2500/222; F24F 11/36; F04B 43/009; G01M 3/26; C09K 5/045; C09K 59/00; C09K 5/042; C09K 8/514
USPC .......................................................... 62/129
See application file for complete search history.

(56) References Cited

U.S. PATENT DOCUMENTS

| | | | | |
|---|---|---|---|---|
| 5,929,002 | A * | 7/1999 | Joyce | C09K 8/514 |
| | | | | 166/280.1 |
| 6,197,211 | B1 * | 3/2001 | Nakajima | C09K 5/042 |
| | | | | 252/67 |
| 9,011,716 | B1 * | 4/2015 | Duerr | C09B 59/00 |
| | | | | 252/301.16 |
| 2016/0347979 | A1 * | 12/2016 | Okamoto | C09K 5/045 |

* cited by examiner

*Primary Examiner* — Davis D Hwu
(74) *Attorney, Agent, or Firm* — Hamre, Schumann, Mueller & Larson, P.C.

(57) ABSTRACT

A detection system and method of detection directed towards the detection of refrigerant leaking from a refrigerant circuit in a heating, ventilation, air condition, and refrigeration (HVACR) system. The system including a refrigerant circuit utilizes a working fluid that also contains an additive fluid. The system also includes a detection device that can detect the additional fluid external to the refrigerant circuit. A method of detecting leaking refrigerant is includes adding a detectable fluid to a refrigerant circuit.

20 Claims, 2 Drawing Sheets

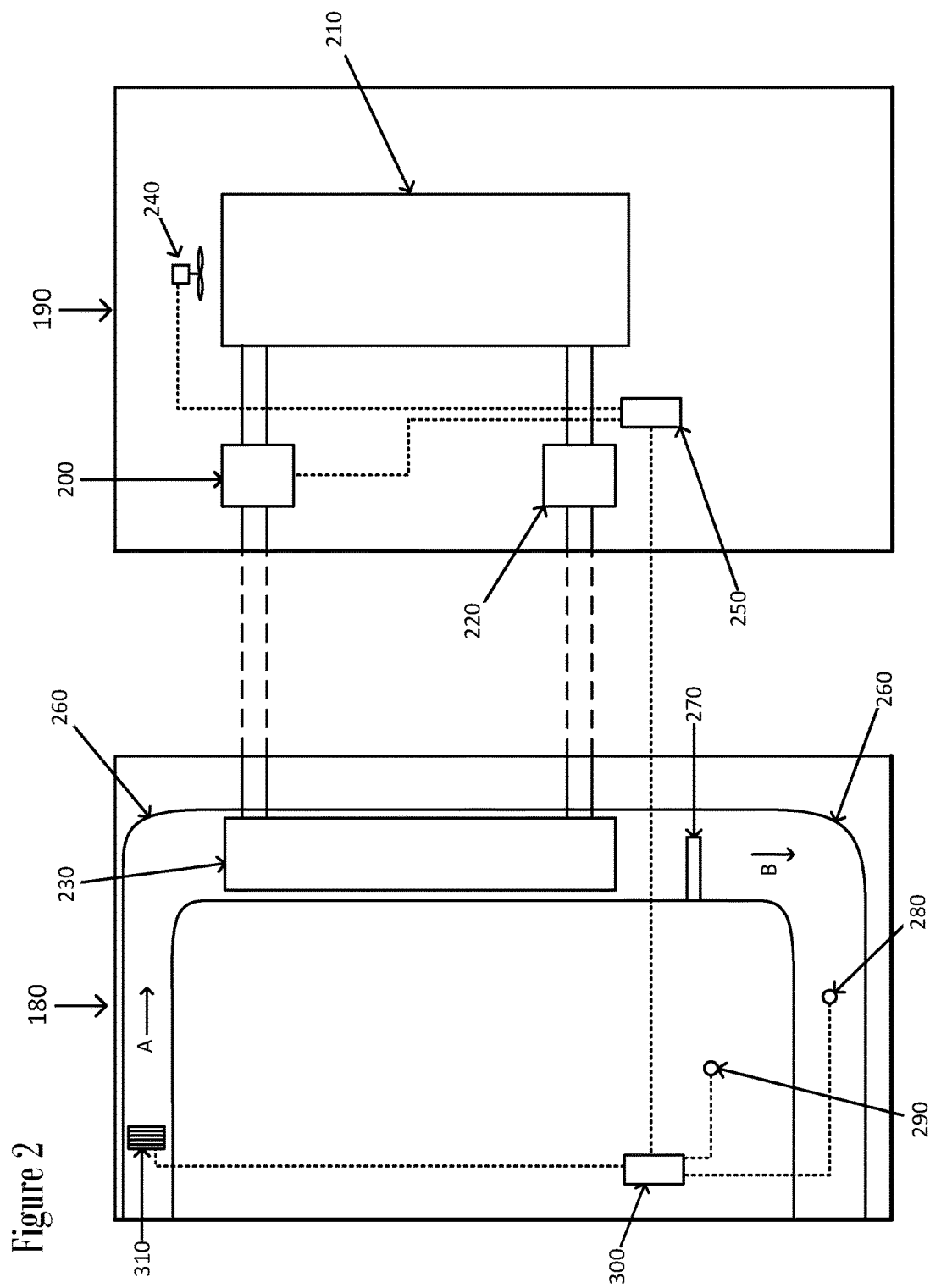

REFRIGERANT LEAK DETECTION BY USE OF FLUID ADDITIVE

FIELD

This disclosure relates to a heating, ventilation, air conditioning, and refrigeration (HVACR) system. More specifically, the embodiments within relate to the detection of a refrigerant leak in a HVACR system.

BACKGROUND

HVACR systems are generally used to heat, cool, or ventilate an area of a building. Specifically, a HVACR system may include a refrigerant circuit to help cool the area. Typically, the refrigerant circuit in a HVACR system will include a compressor, evaporator, and condenser. Some refrigerant circuits may also include an expansion device or chamber.

SUMMARY

The refrigerant circuit used by a HVACR system utilizes a working fluid, typically a refrigerant is used. The refrigerant can be toxic, flammable, or both. A leak in the refrigerant circuit may discharge a dangerous refrigerant, making an area dangerous and/or toxic to people. The leaking of refrigerant also leads to a loss of charge in the refrigerant circuit. Refrigerants can be difficult and/or expensive to detect.

In view of the above mentioned, there is a need for a system for detecting a possible leak in the refrigerant circuit of a HVACR system.

In some embodiments, an additional fluid that is detectable external to the refrigerant circuit is added to the refrigerant circuit in addition to the working fluid. This embodiment may also include a detection device that can determine if working fluid is leaking by detecting a specific increase in the concentration of the additive external to the refrigerant circuit.

Another embodiment is a method for detecting a refrigerant leak. This method includes the addition of an additional detectable fluid to the refrigerant circuit. The embodiment also describes the detection of the concentration of the detectable fluid external to the refrigerant circuit and the determination if the refrigerant circuit is a physically closed system based upon the detectable concentration.

BRIEF DESCRIPTION OF THE DRAWINGS

Both described and other features, aspects, and advantages of the HVACR leak detection system and methods of detecting a leak in a HVACR system will be better understood when the detailed description is read with reference to the accompanying drawings:

FIG. 2 shows an embodiment of a HVACR detection system in a ducted, split system HVACR system that is being used to cool a structure.

DETAILED DESCRIPTION

Figure 1:
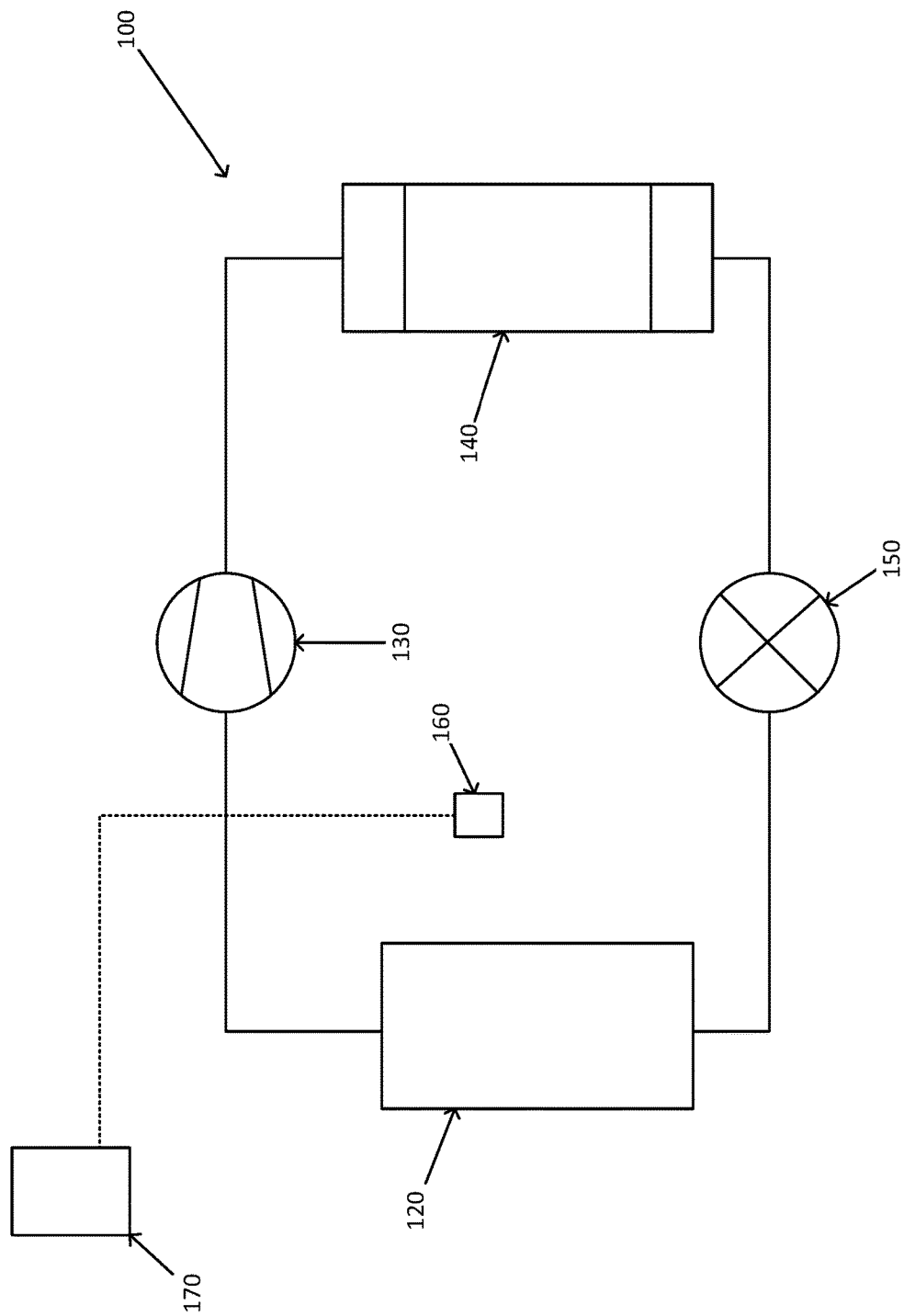
FIG. 1 shows simplified diagram illustrating one embodiment of a HVACR system including a refrigerant circuit and an additive detection system.

Generally, heating, ventilation, air conditioning, and refrigeration systems ("HVACR") are used to cool or heat one or more process areas. A HVACR will generally utilize a working fluid, normally a refrigerant, in a circuit to cool or heat some type of fluid (generally referred to as a process fluid). A refrigerant as described herein may include a single refrigerant or a mixture of multiple refrigerants, and include one or more refrigerant additives (lubricants, stabilizers, etc.). Commonly, a HVACR works upon a process fluid in a specific area and then introduces the process fluid to a different area to change the temperature or humidity of the fluid in that area. In some embodiments, the process fluid will be air and the HVACR will enable the air to be heated or cooled to a specific temperature. Such an embodiment would allow the HVACR to perform a quality control of the air within a specific area. In some embodiments, the HVACR may utilize a ventilation system to introduce additional air from another area (e.g., air from an outside source). In some embodiments, the HVACR heats or cools an enclosed area. For example, an area that is cooled or heated may be an enclosed area to prevent any heating or cooling from being lost to an outside environment. A chiller unit (also referred to as a water chiller) may also be included in a HVACR. In one embodiments of a chiller unit, the working fluid will heat or cool an intermediary fluid instead of the process fluid. The intermediary fluid may then heat or cool the process fluid. An embodiment of a chiller unit may also be included so that the heat produced in a working fluid during its compression may be exchanged to a transfer fluid. This transfer fluid may then be cooled by an ambient fluid (e.g., outside air, etc.).

In some embodiments, the working fluid (e.g., refrigerant, etc.) utilized by the HVACR may be hazardous to people because the refrigerant is toxic and/or flammable. Recently, HVACR refrigerants are being based around flammable fluids that conform to potential global warming initiatives. Generally, these initiatives prohibit using previously employed non-flammable refrigerants. If a refrigerant leak occurs during the operation of a HVACR, the leaking refrigerant may cause the surrounding environment (or the area being heated/cooled) to become hazardous. As a leak may cause a hazardous area, a detector should be employed to detect if and when a possible leak occurs. Additionally or alternatively, a leak in a refrigerant circuit may lead to a loss of charge in the refrigerant circuit. The loss of charge can lead to the refrigerant circuit and/or HVACR operating at a lower efficiency. This loss of efficiency would increase the user's cost of operating a HVACR system. A leak detector may be employed to prevent this loss of charge.

Generally, a detector that can specifically detect a refrigerant is complex and costly. The current methods of detecting a leaking refrigerant generally involve using a more expensive detector that detects a specific refrigerant or a volatile organic compound used by the HVACR. In some cases, an expensive oxygen depletion sensor may be employed. Commonly, these types of detectors also have reliability concerns, which in turn will require a more complex system and/or the additional servicing of the system.

In view of the foregoing, embodiments described below include a system for detecting a leak in a refrigerant circuit of a HVACR by using an additive that has been added to the working fluid of the refrigerant circuit. Additionally, embodiments for a method of detecting a leaking in a HVACR system are also described.

Some embodiments include a detection system to help solve this problem by adding a more easily detectable additional fluid ("additive") to the refrigerant circuit. A variety of different additives may be added to the refrigerant. An embodiment generally utilizes an additive that is easily detectable in the environment outside the HVACR refrigerant circuit. An embodiment may choose an additive depending upon the additive's compatibility with the HVACR's materials and lubricants. Other embodiments may select an additive depending upon the effect the additive may have on a HVACR's efficiency.

The amount of additive utilized in an embodiment is generally dependent upon the specifics of the embodiment. For example, some embodiments may consider the additive's detectable lower concentration limit, if and how a leak may make an area hazardous, and the impact the additive has on the efficiency of the HVACR. An embodiment may consider one or more of a variety of factors in selecting an additive; as such, many other factors (which are not listed here) may be considered when determining the amount of additive used in a specific embodiment. It should be appreciated that theoretical modeling, physical testing, or other experimentation may be employed to consider such factors; for example, theoretical modeling may be utilized to determine how different additives and different additive amounts affect the efficiency of an HVACR. It will be appreciated that from such modeling, testing, experimentation and the like, suitable and/or desired types of additives including ranges of amounts thereof may be selected for a certain designed HVACR.

A large range of fluids could be used as an additive fluid. An embodiment may employ a gas as an additive; for example, an embodiment may utilize an additive fluid including one or more of carbon monoxide ("CO"), carbon dioxide ("CO2"), inert gas such as nitrogen or argon, helium, krypton, carbonyl sulfide, sulfur dioxide, nitrous oxide, and nitric oxide.

Some embodiments may select CO or CO as an additive because both have a history of being compatible with HVACR systems. An embodiment may also utilize CO or CO2 as an additive because the detection of CO and the detection of CO2 are both well-known technologies such that the detectors for CO and/or CO2 are generally inexpensive. An embodiment may utilize CO2 as it would incorporate a CO2 detector, which can also be used to monitor air quality. An embodiment may incorporate a CO and/or CO2 detector such that it satisfies any current regulations (e.g., a state law, federal law, etc.) for CO and/or CO2 detectors. An embodiment may also choose CO and/or CO2 as an additive because it may incorporate an already active CO and/or CO2 detector that is required by current regulations.

Some embodiments may utilize CO2 as it has been shown to have a small effect on an HVACR's efficiency. Carbon monoxide may also be used in some embodiments because it is generally detectable at the very low concentration levels. For example, an embodiment may effectively detect a refrigerant leak from a refrigerant/CO mixture that contains CO in quantities of around 0.05% wt. of the refrigerant/CO mixture. An embodiment may select CO2 and/or CO as an additive, with the CO2 and/or CO comprising between 0.1% wt. and 1.5% wt. of the refrigerant/additive mixture; another embodiment may also utilize CO2 and/or CO comprising between 0.1% wt. and 0.5% wt. of the refrigerant/additive mixture. These ranges may be similarly applied to the other types of additives described.

An embodiment employing CO and/or CO2 as an additive may still effectively detect a hazardous buildup of background CO and/or CO2 because the buildup of CO and CO2 to hazardous levels generally occurs in a different manner than a refrigerant leak. Normally, the general buildup of CO/CO2 in an area, which is known to be toxic and/or deadly, occurs as small amounts of CO/CO2 are continually added to an area over a longer period of time. Generally, an area will only become hazardous when it has very little external air circulation (e.g., a building in the winter, etc.). This causes the small amounts of CO and/or CO2 to slowly build up over time until reaching a hazardous level. The small amounts of CO and/or CO2 are generally the result of some type of activity that involves burning fuel (e.g., gas cooking, the burning of candles, the firing of a furnace, etc.). A CO and/or CO2 detector that is close to one of these activities may detect a spike in the CO and/or CO2 concentration, but the spike in concentration quickly fades. Generally, to prevent false alarms from a concentration spike, a detector will only send a warning if the concentration of CO/CO2 is greater than a certain threshold for a specific period of time. As such, a CO and/or CO2 detector may send a warning of a buildup of CO/CO2 when the concentration of CO/CO2 has gradually increased to specific threshold and then stays above the specific threshold for a specific period of time.

In contrast, a leak that occurs from a HVACR system would generate a sudden, relatively large increase in the concentration of CO. The increase of CO or CO2 would occur suddenly because the process fluid (e.g., air, etc.) would go from being uncontaminated by the refrigerant/additive mixture to suddenly including the refrigerant/additive mixture after a leak occurs. This sudden concentration increase would also be sustained for a longer period of time as the refrigerant (and additive) slowly drain from the refrigerant circuit. As this is the case, an embodiment would only warn of a leak in the HVACR when there is a sudden large increase of CO or CO2 for a specified time period. This may similarly apply to the other types of additives described herein.

An embodiment may also include a detector or detectors that are integrated into the HVACR system. If a detector is integrated into the HVACR system, the HVACR can ventilate the area (e.g., introduce air from outside, etc.) to dilute any harmful gases (e.g., leaking refrigerant, background CO/CO2 buildup, furnace gas, etc.) when the detector detects a specific concentration of harmful gases. An embodiment may also be configured to notify specific people (e.g., telephone call to a specific person or HVACR servicer, etc.) and/or other systems (e.g., area's security system, warning by internet connection to the HVACR servicer's system, etc.) of any detector warning. For example, an embodiment may include an HVACR that ventilates an area when a detector detects a background concentration of CO and/or CO2 (not from a refrigerant leak) as described above.

Many CO and/or CO2 detectors operate using an active monitoring technique; meaning, when functional, the detector is always sending out a signal. An embodiment may employ an actively monitoring detector because it would be advantageous to the HVACR user. This is advantageous to the user because servicing of detector is not required to determine if the detector is currently functioning; the fact the detector is sending a signal would determine it is still functional. When an active monitoring detector is not functioning, it does not send a signal. In contrast, an embodiment that includes a detector not using an active monitoring technique will only produce an output signal when the detector detects a concentration greater than a predetermined concentration (e.g., when a leak occurs). As such, the user of the HVACR cannot continually determine if the detector is functioning without specifically testing the detector (e.g., the detector being tested during the routine servicing of the entire HVACR system).

FIG. 1 shows a diagram of an exemplary embodiment of a HVACR leak detection system. The basic components of a HVACR system are shown in the heat transfer circuit 100. FIG. 1 illustrates an embodiment where the heat transfer circuit 100 is utilized as a cooling circuit that operates using refrigerant to cool a process fluid. The heat circuit 100 as described applies known principles of fluid compression and cooling. It will be appreciated that the aspects of the heat transfer circuit 100 may be modified, but to only encompass those embodiments described within the specification.

In an embodiment the heat transfer circuit 100 is a closed fluid circuit that fluidly connects an evaporator 120, compressor 130, condenser 140, and expansion device 150. In the embodiment described, the heat transfer circuit 100 is a cooling circuit. In describing the operation of the heat transfer circuit 100, the description will start with the refrigerant flowing into the compressor 130 (from the evaporator 120). The refrigerant flows into the compressor 130 in a mostly gaseous state. The compressor 130 then compresses the fluid from a low pressure gas to a high pressure gas; this compression causes the gas to rapidly heat. The high pressure and high temperature gas then flows to the condenser 140. In the condenser 140, heat is transferred from the refrigerant to another fluid (e.g., air, water, etc.) to cool the refrigerant. The refrigerant will become mostly liquid as it is cooled. The cooled, liquid refrigerant then flows into an expansion device 150. The expansion device 150 allows the liquid to quickly expand and to convert into a partly gaseous state, causing the temperature of the refrigerant to lower. The low temperature gaseous/liquid mixture of refrigerant then flows into the evaporator 120. The refrigerant inside the evaporator 120 then heats as it absorbs heat from a process fluid (which in this embodiment is being cooled) that is also flowing through the evaporator 120. As the refrigerant in the evaporator 120 heats, the refrigerant will become mostly gaseous.

Additional embodiments of a heat transfer circuit 100 as described in FIG. 1 may include additional components such as a fluid overflow chamber, bypass values, or additional pumps. Alternative embodiments may use the heat transfer circuit 100 as a heating circuit by removing certain elements and running the circuit's fluid flow in an opposite direction.

Also shown in FIG. 1 are an additive detector 160 and an HVACR controller 170. As shown in FIG. 1, the additive detector 160 is placed outside of the heat transfer circuit 100. In some embodiments an additive detector 160 may be placed in the same general area as the HVACR. For example, the additive detector 160 may be placed in the mechanical room that contains the HVACR's equipment (e.g., compressor, furnace, outside surface of any venting, etc.). Another embodiment may place the additive detector 160 on a specific piece of HVACR system's equipment; for example, the additive detector 160 may be directly placed onto the evaporator 120, compressor 130, or condenser 140. Another embodiment may place the additive detector 160 in the area being heated or cooled by the heat circuit. For example, the additive detector may be placed in an office of a commercial building or the living room of a residential house. In some embodiments a ducting or piping system may be used to transfer the process fluid to and from the areas to be cooled or heated. In such embodiments, the additive detector 160 may be placed in the ducting or piping. For example, an embodiment may place the additive detector 160 inside the ducting immediately before and or immediately after the evaporator 120.

The embodiment shows only one additive detector 160, but a leak detection system could be designed to employ multiple detectors. The additive detector 160 or additional additive detectors (not shown) do not have to be connected to the HVACR controller 170 as shown, but this connection is preferable as it would allow the HVACR to ventilate the area and/or contact a specified party or other system if a leak is detected.

The heat transfer circuit 100 may also be configured to heat or cool a transfer fluid or medium (e.g., water, water like substance, etc.) in which case the heat transfer circuit 100 may be part of a water chiller. In an embodiment where the heat transfer circuit is part of a water chiller, the evaporator 120 may exchange heat with a transfer fluid which then heats or cools a process fluid (e.g., air, etc.). The transfer fluid would also be contained in its own fluidly closed circuit (not shown).

Alternatively, an embodiment of a water chiller may use a transfer fluid or medium (e.g. water, water like substance, etc.) to cool the working fluid (e.g., refrigerant, etc.) in the condenser 140. In an embodiment where the transfer fluid is cooling the working fluid, the transfer fluid may then be cooled by a separate fluid such as ambient air.

FIG. 2 illustrates an embodiment of a HVACR leak detection system. This embodiment describes a ducted, split system HVACR that is being used to cool a building. The description is applied to the use of CO or $CO_2$, but other embodiments may similarly utilize other additive gases. The embodiment shown in FIG. 2 illustrates a refrigerant circuit that utilizes a compressor 200, a condenser 210, an expansion device 220, and an evaporator 230. The principles of operating the refrigeration circuit would apply in a similar manner as described above for the heat transfer circuit 100.

In this embodiment the refrigerant circuit in this system travels between two locations: an ambient environment 190 and a cooling area 180. In many embodiments the ambient environment 190 may be located outside the building and in an area where the process heat in the working fluid (e.g., refrigerant and additive mixture, etc.) can be transferred from the working fluid into some other medium. As this embodiment depicts the ambient environment 190 being outside a building, the medium absorbing heat from the working fluid would be air. Commonly, the ambient environment 190 will be on the roof of taller buildings, on the side of buildings with a lot of unused area around them, or encapsulated in a smaller unit located on the ground next to the building for smaller buildings (e.g., a residential house, etc.).

In this embodiment the ambient environment 190 contains a compressor 200, condenser 210, expansion device 220, condenser fan 240, and refrigerant circuit controller 250. In this embodiment, the condenser fan 240 is a large fan or blower that increases the flow of ambient air through the condenser 210, which is being used as a fluid to cool the refrigerant, through the condenser 210. The compressor 200 will generally be placed in the ambient environment 190 as it produces a significant amount of excess heat. A refrigerant circuit controller 250 is also shown. As shown in the embodiment, the refrigerant circuit controller 250 is connected to the compressor 200, condenser 210, condenser fan 240, and refrigerant leak detection controller 300 (described below). These connections allow the refrigerant circuit controller 250 to control the flow of working fluid in the refrigerant circuit by turning off the different components of the refrigerant circuit. Other embodiment may also be configured such that the refrigerant circuit contains additional equipment such as additional heating/cooling areas, condensers, compressors, or intermediary pumps or blowers. These additional pieces of equipment may also be connected to the refrigerant circuit controller 250, such that the refrigerant circuit controller 250 can stop the flow of refrigerant mixture in the refrigerant circuit by controlling the individual components.

The second area illustrated in FIG. 2 is a cooling area 180. This area is generally located within a building, but may be located outside the building if the parameters of the building require it. An embodiment shown is for a residential building, so the cooling area 180 may be a garage, closet, or attic that is large enough to contain the equipment described. An embodiment for a commercial area may use a larger maintenance closet, a basement, or any other area large enough to contain the equipment described.

In this embodiment, the cooling area 180 contains an evaporator 230, duct 260, furnace inlet 270, in-vent detector 280, exchange area detector 290, detector controller 300, and duct fan 310. Cooled work fluid enters the evaporator 230, which is located within the duct 260, from the expansion device 220. Air, either from inside or outside the building, is pulled into the vent by a duct fan 310 and travels through the duct 260 in the direction of arrow A. The air then flows through the evaporator 230 where the air is cooled by the cool working fluid in the refrigerant circuit. After exiting the evaporator, the air travels in the direction of arrow B, passing the furnace inlet 270 and the in-vent detector 280, before it flows into the duct system (not shown) where the cooled air is distributed to the area to be cooled. The furnace inlet 270 is the location where heated air from a furnace (or other heating device) would enter the duct 260 so that it may be distributed through the duct system (not shown). In this embodiment, the furnace inlet 270 is downstream from the evaporator 230.

FIG. 2 shows an embodiment of a leak detection system including two detectors: an in-vent detector 280 and an area detector 290. The in-vent detector 280 should generally be located after the condenser 230 and furnace inlet 270 because this allows for the detection of a leak from the HVACR and a large concentration of CO or CO2 flowing from the furnace inlet 270. In some embodiments the in-vent detector 250 may be configured for the detection of natural gas or other combustible fuel that may come from the furnace inlet 270 (such as when the furnace is malfunctioning). In some embodiments the additive used in the refrigerant circuit is not CO or CO2, in those embodiments the in-vent detector 280 may be located in any position downstream from the condenser 230 such that it may detect any leaking refrigerant mixture exiting the condenser 230.

An embodiment may place the area detector 290 in the same area (e.g., room, etc.) as the evaporator 230. The current standard generally requires a CO and/or CO2 detector to be placed on the equipment or in the room with the equipment, less than 24 inches from the ground. As such, an embodiment may place the area detector 290 so that it meets this standard. In this embodiment the area detector 290 has been placed in a location where it can detect any possible additive (in the working fluid) that may have leaked outside of the duct 260. An embodiment having two separate detectors, such as those described, can detect a refrigerant leak in either the condenser or in the piping, tubing, or venting that transfers the refrigerant to the condenser 230. A refrigerant leak from an internal part of the condenser 230 would be carried by the flowing air in the duct 260 and detected by the in-vent detector 280. Alternatively, a refrigerant leak from an external part of the condenser 280 or the piping/tubing connected to the condenser 280 (which is within the cooling area 180) would be detected by the area detector 290.

Other embodiments may place the area detector 290 or additional area detectors (not shown) in those areas being cooled by the HVACR system; the downside to placing additional detectors farther from the condenser 230 is that any leaking additive will have been diluted when it reaches the detector. An embodiment employing CO as an additive may utilize previously installed CO detectors to supplement or replace the area detector 290 as described. In an embodiment employing CO as an additive, the in-vent detector 280 could also be designed to replace the CO detector for an occupied space that is required by some building regulations (e.g., state laws). An existing CO2 detector could also be modified for use by the detection system.

The embodiment as shown illustrates the use of two separate additive detectors, but only one detector is required. As described above, an embodiment may also employ more than two detectors. The embodiment also does not describe detectors in the ambient environment 190. The ambient environment 190 as described in FIG. 2 does not illustrate placing a detector outside the building because the general outside airflow would normally dissipate any leaking refrigerant and because people are not located around the equipment outside the building. For example, an embodiment may include a detector in this area as it if any of the refrigerant circuit is located inside a building (not already being encompassed by the cooling area 180), people are around any of the equipment, or the general detection of an outside leak is important.

An embodiment where the refrigerant circuit is part of a water chiller may also include a detector in the ambient area 190 as the ambient area 190 may be located within the building. An embodiment that uses a refrigerant circuit as part of chiller unit may use a transfer fluid in the condenser 210 instead of air. Generally, this transfer fluid would then travel to separate area where it may transfer heat with an ambient fluid (e.g., outside air, etc.). In an embodiment when the refrigerant circuit is part of a water chiller as described, the ambient area 190 may be located inside; an ambient area 190 that is located within the building should be provided with a detector (or detectors) similar to the in-vent detector 280 and/or the area detector 290 that is provided for the cooling area 180.

Aspects:

Any of aspects 1-13 can be combined with any of aspects 14-22.

Aspect 1. A refrigerant detection system, comprising:
a refrigerant circuit;
a working fluid that flows through the refrigerant circuit;
an additive that is detectable external to the refrigerant circuit, wherein the additive is a fluid in the refrigerant circuit in addition to the working fluid; and
a detection device to determine the working fluid is leaking from the refrigerant circuit based on detecting a sudden increase of a concentration of the additive external to the refrigerant circuit.

Aspect 2. The refrigerant system of aspect 1, wherein the additive is selected from a group consisting of carbon monoxide, carbon dioxide, nitrogen, helium, argon, krypton, carbonyl sulfide, sulfur dioxide, nitrous oxide, and nitric oxide.

Aspect 3. The refrigerant system of either of aspects 1 or 2, wherein the additive is carbon monoxide.

Aspect 4. The refrigerant system of either of aspects 1 or 2, wherein the additive fluid is carbon dioxide.

Aspect 5. The refrigerant system of either of aspects 1 or 2, wherein the additive is a relatively inert gas.

Aspect 6. The refrigerant system of any of aspects 1, 2 or 5, wherein the additive is argon, nitrogen, or krypton.

Aspect 7. The refrigerant system of either of aspects 1 or 2, wherein the additive is sulfur dioxide.

Aspect 8. The refrigerant system of any of aspects 1-7, wherein
a duct that directs air to and from a condenser or a evaporator of the refrigerant circuit, the detection device being positioned within the duct.

Aspect 9. The refrigerant system of any of aspects 1-8, wherein the detection device is positioned downstream of the condenser or the evaporator Aspect 10. The refrigerant system of any of aspects 1-9, wherein
the refrigeration circuit includes a condenser or a evaporator, and
the detection device being positioned in a room containing the condenser or the evaporator.

Aspect 11. The refrigerant system of any of aspects 1-10, further comprising:
a HVACR controller configured to ventilate an area when the detection device detects a specific amount of the additive.

Aspect 12. The refrigerant system of any of aspects 1-11, wherein the additive is between 0.1% and 1.5% by weight of the additive and the working fluid mixture in the refrigerant circuit.

Aspect 13. The refrigerant system of any of aspects 1-12, wherein the additive is between 0.1% and 0.5% by weight of the additive and the working fluid mixture in the refrigerant circuit.

Aspect 14. A method of detecting a leak in a refrigerant circuit, comprising:
operating a refrigerant circuit that utilizes a working fluid;
adding an additional detectable fluid into the refrigerant circuit;
detecting a concentration of the detectable fluid external to the refrigerant circuit; and
determining that the refrigerant circuit is not a physically closed system if the external concentration of the detectable fluid is different from a reference concentration.

Aspect 15. The method of aspect 14, wherein the detectable fluid is carbon monoxide.

Aspect 16. The method of aspect 14, wherein the detectable fluid is carbon dioxide.

Aspect 17. The method of aspect 14, wherein the detectable fluid is a relatively inert gas.

Aspect 18. The method of aspect 14, wherein the detectable fluid is sulfur dioxide.

Aspect 19. The method of any of aspects 14-18, wherein an amount of the detectable fluid added is selected so that the detectable fluid is between 0.1% and 1.5% by weight of the detectable fluid and the working fluid mixture in the refrigerant circuit.

Aspect 20. The method of any of aspects 14-19, wherein an amount of the detectable fluid added is selected so that the detectable fluid is between 0.1% and 0.5% by weight of the detectable fluid and the working fluid mixture in the refrigerant circuit.

Aspect 21. The method of any of aspects 14, 17, 19, or 20, wherein the detectable fluid is argon, nitrogen, or krypton.

Aspect 22. The method of any of aspects 14-20, wherein the detectable fluid is selected from a group consisting of carbon monoxide, carbon dioxide, nitrogen, helium, argon, krypton, carbonyl sulfide, sulfur dioxide, nitrous oxide, and nitric oxide.

The examples and embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed:

1. A refrigerant detection system, comprising:
a refrigerant circuit;
a working fluid that flows through the refrigerant circuit;
an additive that is detectable external to the refrigerant circuit, wherein the additive is a fluid in the refrigerant circuit in addition to the working fluid; and
a detection device to determine the working fluid is leaking from the refrigerant circuit based on detecting a sudden increase of a concentration of the additive external to the refrigerant circuit.

2. The refrigerant system of claim 1, wherein the additive is selected from a group consisting of carbon monoxide, carbon dioxide, nitrogen, helium, argon, krypton, carbonyl sulfide, sulfur dioxide, nitrous oxide, and nitric oxide.

3. The refrigerant system of claim 2, wherein the additive is carbon monoxide.

4. The refrigerant system of claim 2, wherein the additive fluid is carbon dioxide.

5. The refrigerant system of claim 2, wherein the additive is sulfur dioxide.

6. The refrigerant system of claim 1, wherein the additive is a relatively inert gas.

7. The refrigerant system of claim 1, wherein
a duct directs air to and from a condenser or a evaporator of the refrigerant circuit, and
the detection device being positioned within the duct.

8. The refrigerant system of claim 7, wherein the detection device is positioned downstream of the condenser or the evaporator.

9. The refrigerant system of claim 1, wherein
the refrigeration circuit includes a condenser or a evaporator, and
the detection device being positioned in a room containing the condenser or the evaporator.

10. The refrigerant system of claim 1, further comprising:
a HVACR controller configured to ventilate an area when the detection device detects a specific amount of the additive.

11. The refrigerant system of claim 1, wherein the additive is between 0.1% and 1.5% by weight of the additive and the working fluid mixture in the refrigerant circuit.

12. The refrigerant system of claim 1, wherein the additive is between 0.1% and 0.5% by weight of the additive and the working fluid mixture in the refrigerant circuit.

13. A method of detecting a leak in a refrigerant circuit, comprising:
operating a refrigerant circuit that utilizes a working fluid;
adding a detectable fluid into the refrigerant circuit;
detecting an external concentration of the detectable fluid, when the detectable fluid is external to the refrigerant circuit; and
determining that the refrigerant circuit is not a physically closed system if the external concentration of the detectable fluid is different from a reference concentration.

14. The method of claim 13, wherein the detectable fluid is selected from a group consisting of carbon monoxide, carbon dioxide, nitrogen, helium, argon, krypton, carbonyl sulfide, sulfur dioxide, nitrous oxide, and nitric oxide.

15. The method of claim 14, wherein the detectable fluid is carbon monoxide.

16. The method of claim 14, wherein the detectable fluid is carbon dioxide.

17. The method of claim 14, wherein the detectable fluid is sulfur dioxide.

18. The method of claim 13, wherein the detectable fluid is a relatively inert gas.

19. The method of claim 13, wherein an amount of the detectable fluid added is selected so that the detectable fluid is between 0.1% and 1.5% by weight of the detectable fluid and the working fluid mixture in the refrigerant circuit.

20. The method of claim 13, wherein an amount of the detectable fluid added is selected so that the detectable fluid is between 0.1% and 0.5% by weight of the detectable fluid and the working fluid mixture in the refrigerant circuit.

\* \* \* \* \*